United States Patent [19]

Chujo et al.

[11] Patent Number: 5,412,376
[45] Date of Patent: May 2, 1995

[54] METHOD FOR STRUCTURING COMMUNICATIONS NETWORK BASED ON ASYNCHRONOUS TRANSFER MODE

[75] Inventors: Takafumi Chujo; Hiroaki Komine; Keiji Miyazaki; Takao Ogura; Tetsuo Soejima, all of Kawasaki, Japan

[73] Assignee: Fujitsu Limited, Kawasaki, Japan

[21] Appl. No.: 197,548

[22] Filed: Feb. 17, 1994

Related U.S. Application Data

[63] Continuation of Ser. No. 789,959, Nov. 12, 1991, abandoned.

[30] Foreign Application Priority Data

Nov. 9, 1990 [JP] Japan .................. 2-302558

[51] Int. Cl.$^6$ .................................. H04Q 1/00
[52] U.S. Cl. ...................... 340/825.01; 340/826; 370/94.3
[58] Field of Search .............. 340/825.06, 826, 825.01; 370/16, 94.1, 94.2, 94.3, 60, 60.1

[56] References Cited

U.S. PATENT DOCUMENTS

| | | | |
|---|---|---|---|
| 4,884,263 | 11/1989 | Suzuki | 370/16 |
| 4,964,095 | 10/1990 | Tyrell | 370/16 |
| 5,070,497 | 12/1991 | Kleine-Altekamp | 340/825.06 |
| 5,072,440 | 12/1991 | Isono | 370/16 |
| 5,084,867 | 1/1992 | Tachibana | 370/16 |

OTHER PUBLICATIONS

Packet Exchange System, 62-242441, Oct. 23, 1987 (Abstract).
Bypass Route Selection Processing System, 2-1315-4(A), Jan. 17, 1990 (Abstract).

Primary Examiner—Donald J. Yusko
Assistant Examiner—Brian Zimmerman
Attorney, Agent, or Firm—Staas & Halsey

[57] ABSTRACT

A method for structuring a communications network based on an asynchronous transfer mode in which communications are held with the use of cells transferred between a node on the upstream side and a node on the downstream side. The method for structuring the network includes a step for preparing a plurality of VPI conversion tables for converting VPIs of the cell input under normal communicating conditions and that of the cell input in the event of a failure and outputting the cell with the VPI converted. The prepared VPI conversion tables are reorganized for each node and the reorganized VPI conversion tables are distributed to all nodes. Then, an alternate route monitoring and switching virtual path is set up in each alternate route and a monitoring cell is periodically transmitted along the alternate route. When a failure occurs, the VPI conversion table is switched over according to the pattern of the failure and the input VPI is converted in accordance with the switched VPI conversion table, and thereby, an alternate virtual path is set up in the relevant alternate route.

11 Claims, 9 Drawing Sheets

METHOD FOR STRUCTURING COMMUNICATIONS NETWORK BASED ON ASYNCHRONOUS TRANSFER MODE

This application is a continuation, of application No. 07/789,959, filed Nov. 12. 1991, now abandoned.

BACKGROUND OF THE INVENTION

1. Field of the Invention

The present invention relates to a method for structuring a communications network based on a asynchronous transfer mode holding communications using cells of a predetermined byte length.

2. Description of the Prior Art

In recent years, ATM (Asynchronous Transfer Mode) transmission system has been extensively studied and developed as a promising basic technology for the broadband ISDN (Integrated Services Digital Network). The ATM transmission system is a technology dividing information into blocks called cells, each thereof having a fixed length of 53 bytes (5 bytes for header and 48 bytes for information field), to achieve high-speed multiplexed information transmission and exchanging. Transmission speed 2.4 Gb/s is attained by this system. The communications network based on such ATM transmission system is expected to have applicability to the basic trunk network and subscribers system in the broadband ISDN in future.

When such communications network on the basis of high speed and broadband optical transmission is structured, survivability of the network comes to have a deep significance. This is because a network failure produces a great injurious effect on the information-oriented society. As to the technology of structuring a network having the ATM transmission system as its base, great efforts are being made for standardization by international standards committees including CCITT. There are demands for a system capable of achieving restoration from failures in the communications network taking advantage of the ATM transmission system.

A characteristic of an ATM communications network is that, even if a virtual path is previously set up in the network, a band in a link connecting one node and the other node cannot be occupied unless a cell is actually transmitted along the path. By making use of this characteristic, it becomes possible to set up alternate virtual paths for each of working virtual paths. Then, when a failure occurs, the node on the upstream side of the working virtual path can quickly achieve restoration from the failure only by switching the working virtual path to the preset alternate virtual path.

Figure 1:
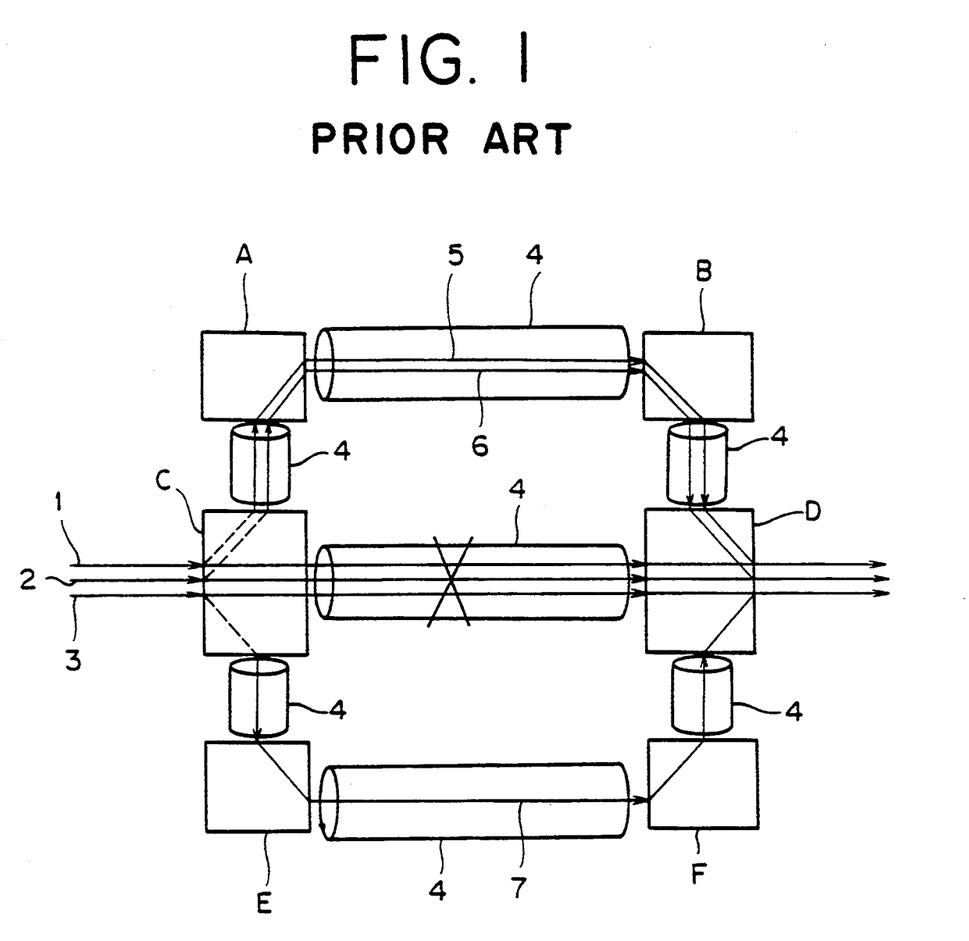
FIG. 1 is a schematic diagram explanatory of a conventional method for achieving restoration from failures in a communications network based on an asynchronous transfer mode.

A conventional method for achieving restoration from failures will be described with reference to FIG. 1. Reference characters A, B, C, D, E, and F denote nodes and the nodes are connected by a link 4 constructed of optical fibers. Reference numeral 1, 2, and 3 denote working virtual paths, which working virtual paths 1 to 3 are accommodated by a link 4 connecting the nodes C and D, and communication is held by transmission of cells along this route. In the route passing through the nodes A and B, there are set up alternate virtual paths 5 and 6 in advance, and in the route passing through the nodes E and F, there is set up an alternate virtual path 7 in advance.

We now suppose that a failure has occurred in the link 4 between the nodes C and D, for example, as indicated by the x mark and hence a cell has become unable to be transmitted along this link. In such case, the node D on the downstream side detects the failure and sends an alarm for station to the node C on the upstream side. Upon receipt of the alarm for station, the node C connects the working virtual paths 1 and 2 to the alternate virtual paths 5 and 6 and also connects the working virtual path 3 to the alternate virtual path 7. Thus, the communication is kept up by having cells transmitted along two routes accommodating the alternate virtual paths 5 to 7.

In the above described conventional method for achieving restoration from failures, it is required that a VPI (Virtual Path Identifier) is assigned to each of the alternate virtual paths 5 to 7 in advance. Our study shows that, in a 25-node network, the link 4 constituting each alternate route is shared by about 16 alternate virtual paths of a single-link failure, and working virtual paths affected by a single-link failure are distributed to alternate virtual paths incorporated in about 5 alternate routes.

Therefore, if it is supposed that 1000 working virtual paths are accommodated by one link, 3200 alternate virtual paths may be passing through the link. In the conventional method for achieving restoration from failures, VPI numbers must be preassigned to these alternate virtual paths. However, since the number of VPIs is limited to 4096 (12 bits), only 975 virtual paths can be set up for working virtual paths. Thus, the conventional method for achieving restoration from failures involved a problem that, while one link can accommodate 4096 virtual paths, the working VPIs which can be accommodated by a link is considerably limited in number because of the necessity of pre-assignment of the alternate virtual paths.

SUMMARY OF THE INVENTION

Accordingly, an object of the present invention is to provide a method for structuring a communications network based on an asynchronous transfer mode in which the number of VPIs which can be assigned to working virtual path is not limited so much.

Another object of the present invention is to provide a method for structuring a communications network based on an asynchronous transfer mode in which, when a failure occurs, restoration from the failure can be quickly achieved.

In accordance with an aspect of the present invention, there is provided a method for structuring a communications network based on an asynchronous transfer mode holding communications with cells transferred between a first node on the upstream side and a second node on the downstream side, the first node and second node being connected by a working route and by a plurality of alternate routes each including a plurality of intermediate nodes, the working route including at least one link accommodating working virtual paths and connecting the first and second nodes, each of the alternate routes including a plurality of links connecting adjoining nodes, and each of the links being capable of accommodating a plurality of virtual paths, the method for structuring a communications network comprising the steps of: preparing a first VPI conversion table according to which the virtual path identifier (VPI) of the input cell is converted to be output under normal communicating conditions; preparing a plurality of second VPI conversion tables according to which the VPI of the input cell is converted into the VPI for an alternate virtual path corresponding to every failure pattern; reorganizing the first and second VPI conversion tables for each node; distributing the reorganized first and second VPI conversion tables to all of the nodes; setting up an alternate route monitoring and switching virtual path in each of the alternate routes; and transmitting a monitoring cell along each of the alternate routes.

When a failure occurs in the working route, the second node detects the failure and transmits an alarm for station to the first node. The first node, upon receipt of the alarm for station, transmits a switching command cell to switch the first VPI conversion table to the second VPI conversion table along each of the alternate route monitoring and switching virtual paths.

The first node and the intermediate nodes, which have received the switching command cell, switch the first VPI conversion table to the second VPI conversion table prepared in advance corresponding to every failure pattern, and convert the VPI of the input cell in accordance with the switched second VPI conversion table and transmit the cell along the alternate route, whereby an alternate virtual path is set up in the alternate route.

When the switching command cells are detected by one of the nodes from a plurality of alternate route monitoring and switching virtual paths incorporated in the links constituting the alternate route, it gives a notice of coincident failures to all of the nodes on the downstream side and an operation system. The operation system, upon receipt of the notice of coincident failures, arbitrates the contention of coincident failures and sets up the alternate route anew.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 2:
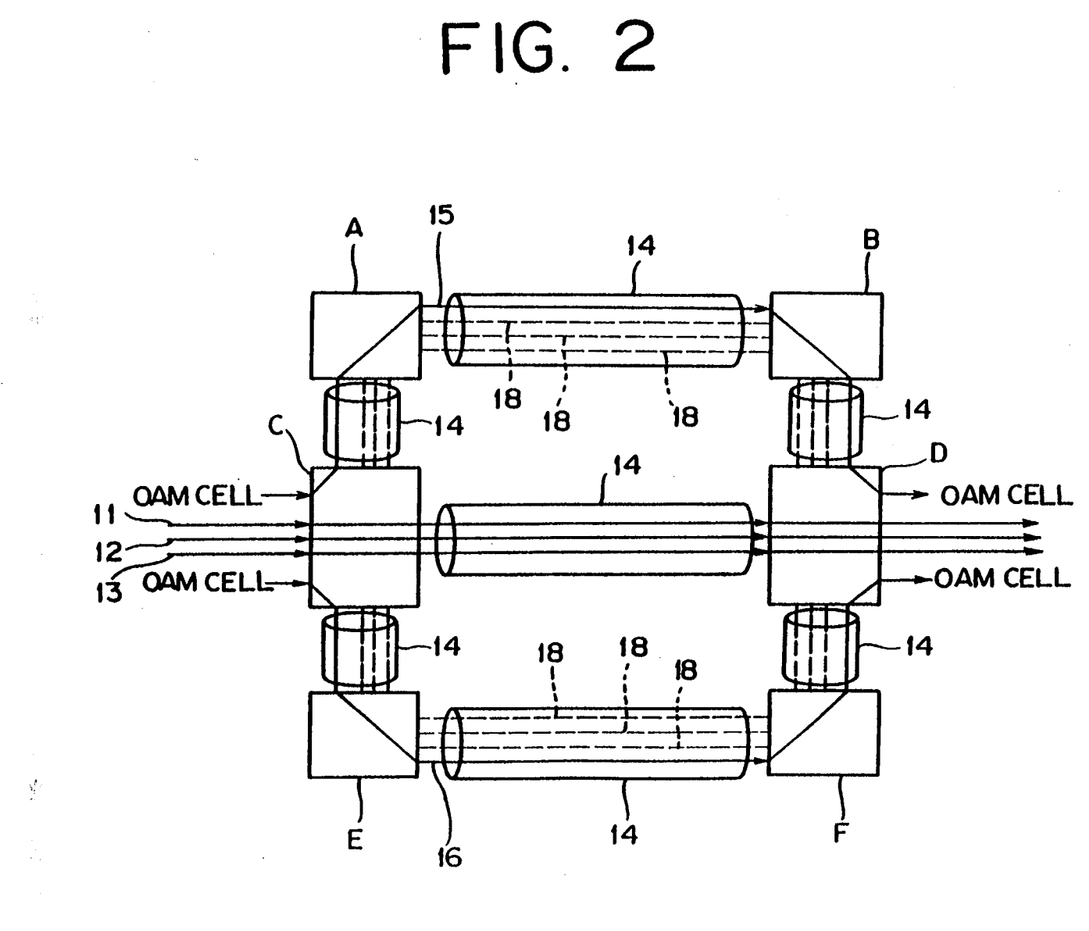
FIG. 2 is a schematic diagram explanatory of a method for structuring a communications network based on an asynchronous transfer mode according to an embodiment of the present invention.

Referring first to FIG. 2, reference characters A–F denote nodes and these nodes are connected by links 14 constructed of an optical fiber or the like. In the link 14 connecting the node C and node D, there are incorporated working virtual paths 11, 12, and 13. In the alternate route passing through the nodes A and B, there is set up an alternate route monitoring and switching virtual path 15, and in the alternate route passing through the nodes E and F, there is set up an alternate route monitoring and switching virtual path 16. Each link 14 constituting the alternate link is capable of accommodating a plurality of shared virtual path links 18 indicated by the dotted lines.

Figure 3:
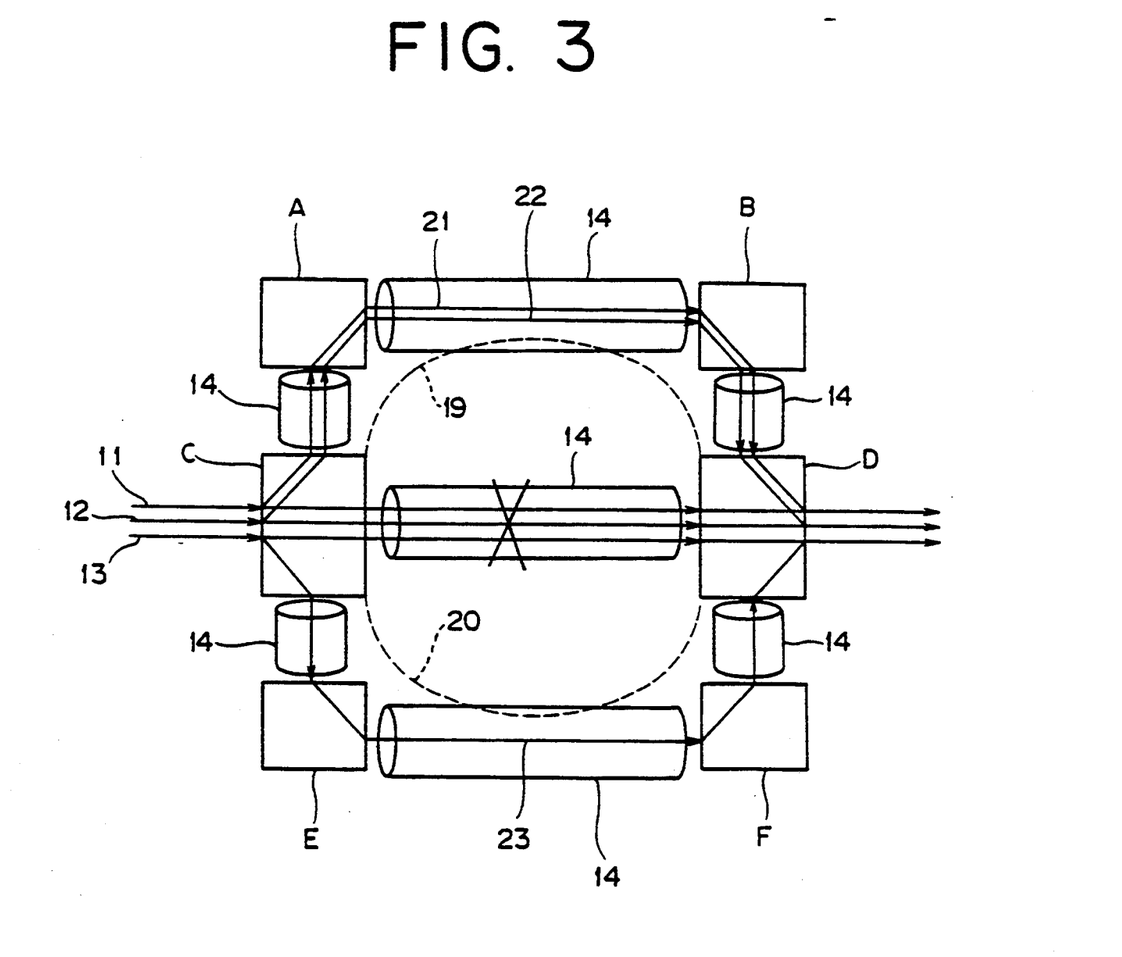
FIG. 3 is a schematic diagram explanatory of preplanning of alternate virtual paths.

The alternate route monitoring and switching virtual paths 15 and 16 are set up in alternate routes 19 and 20, which are provided by preplanning and indicated by broken lines in FIG. 3. In the preplanning, assuming occurrence of single-link failures, the alternate virtual paths capable of coping with the failures of all links of the network are set up in advance. In the example shown in FIG. 3, against a failure of the link connecting the node C and node D indicated by the X mark, alternate virtual paths 21 and 22 of the alternate route 19 passing through the nodes A and B are assigned to the working virtual paths 11 and 12, respectively, and an alternate virtual path 23 of the alternate route 20 passing through the nodes E and F is assigned to the working virtual path 13.

The shared virtual path links 18 indicated by broken lines in FIG. 2 are not only the alternate virtual paths For the alternate routes 19 and 20 but also the alternate virtual paths shared by other plural alternate routes passing through the links 14.

In setting up the alternate route monitoring and switching virtual path 15, 16 and the alternate virtual paths in each link, the operation system prepares a VPI conversion table (preplanned map), to be described later with reference to FIG. 6, for assignment of the VPI (virtual path identifier), which sets up the alternate virtual path, and distributes the VPI conversion table to each node A - F.

Figure 4:
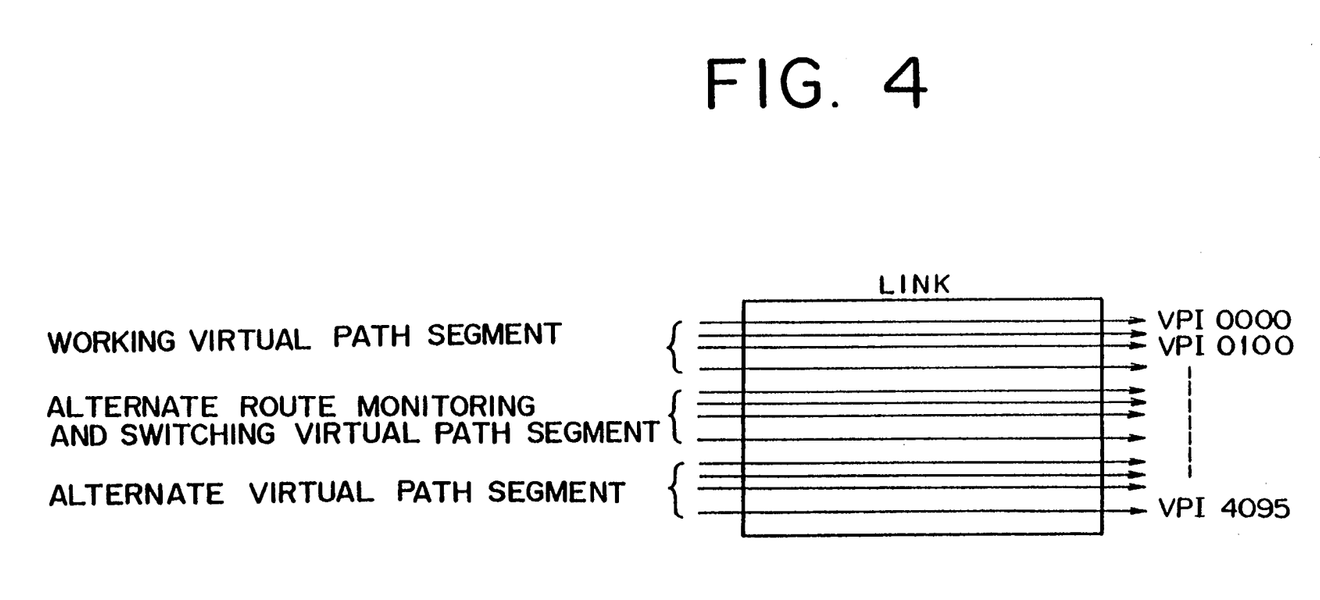
FIG. 4 is a schematic diagram explanatory of allotments for VPI regions in a link.

The VPIs, when the total region for the VPIs are 12 bits, for example, are controlled with its total region divided, as shown in FIG. 4, into three segments of the working virtual path segment, the alternate route monitoring and switching virtual path segment, and the alternate virtual path segment, and idle VPIs in the segments are sequentially assigned to the respective links. The VPIs in the alternate virtual path segment, however, are assigned to multiple times because all of the alternate virtual paths using "the spare bands of the links share these VPIs.

Figure 5:
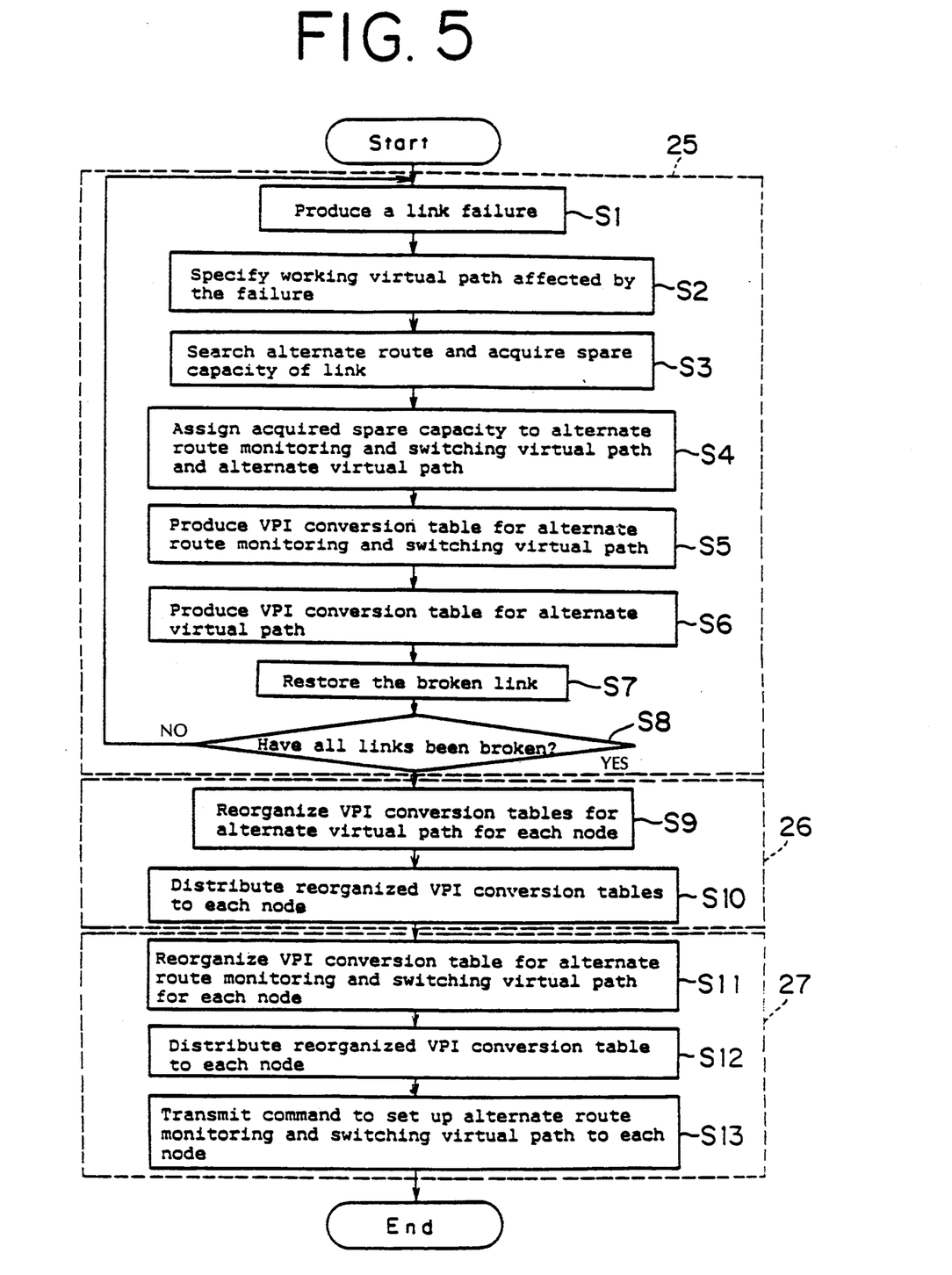
FIG. 5 is a flow chart showing a way of setting up VPI conversion tables and setting up alternate route monitoring and switching virtual paths.

Referring now to FIG. 5, the method for setting up the VPI conversion table (preplanned map) and the method for setting up the alternate route monitoring and switching virtual path will be described. Referring to FIG. 5, the block 25 represents the preplanning of the VPI conversion table, the block 26 represents the setting up of the VPI conversion table in each node, and the block 27 represents the setting up of the alternate route monitoring and switching virtual path. The VPI conversion table for use under normal communicating conditions is prepared at the time when the working virtual paths are set up.

First, in step S1, a failure of a broken link of the network is produced by computer simulation. Then, in step S2, the working virtual path affected by the failure is specified, and, in step S3, an alternate route is searched for and thereby spare capacity of the link is acquired. In step S4, the acquired spare capacity is assigned to each of the alternate route monitoring and switching virtual path and the alternate virtual path.

In step S5, the VPI conversion table for the alternate route monitoring and switching virtual path is made up, and in step S6, the VPI conversion table for the alternate virtual path is made up. The VPI conversion table for use under normal communicating conditions is made up at the time when the working virtual paths are set up.

In step S7, the broken link is restored to the original state. In step S8, it is determined whether or not all the links within the network were broken and the procedure from the step S1 to the step S7 was executed for each of the links. When the decision in the step S8 is NO, the procedure from the step S1 to step S7 is executed anew. When the decision in the step S8 is YES, the procedure advances to step S9, in which the VPI conversion tables for the alternate virtual paths are reorganized for each node. Thus, different VPI conversion tables for the alternate virtual paths are organized for all the nodes in the step S9. In the next step S10, the reorganized VPI conversion tables are distributed to the respective nodes.

Then, in the following step S11, the VPI conversion table for the alternate route monitoring and switching virtual paths is reorganized for each node. The reorganized VPI conversion tables for the alternate route monitoring and switching virtual paths are distributed to the respective nodes in step S12. In the following step S13, a command to set up an alternate route monitoring and switching virtual path is transmitted to each node. Thereby, one alternate route monitoring and switching virtual path is set up in each alternate route.

Figure 6:
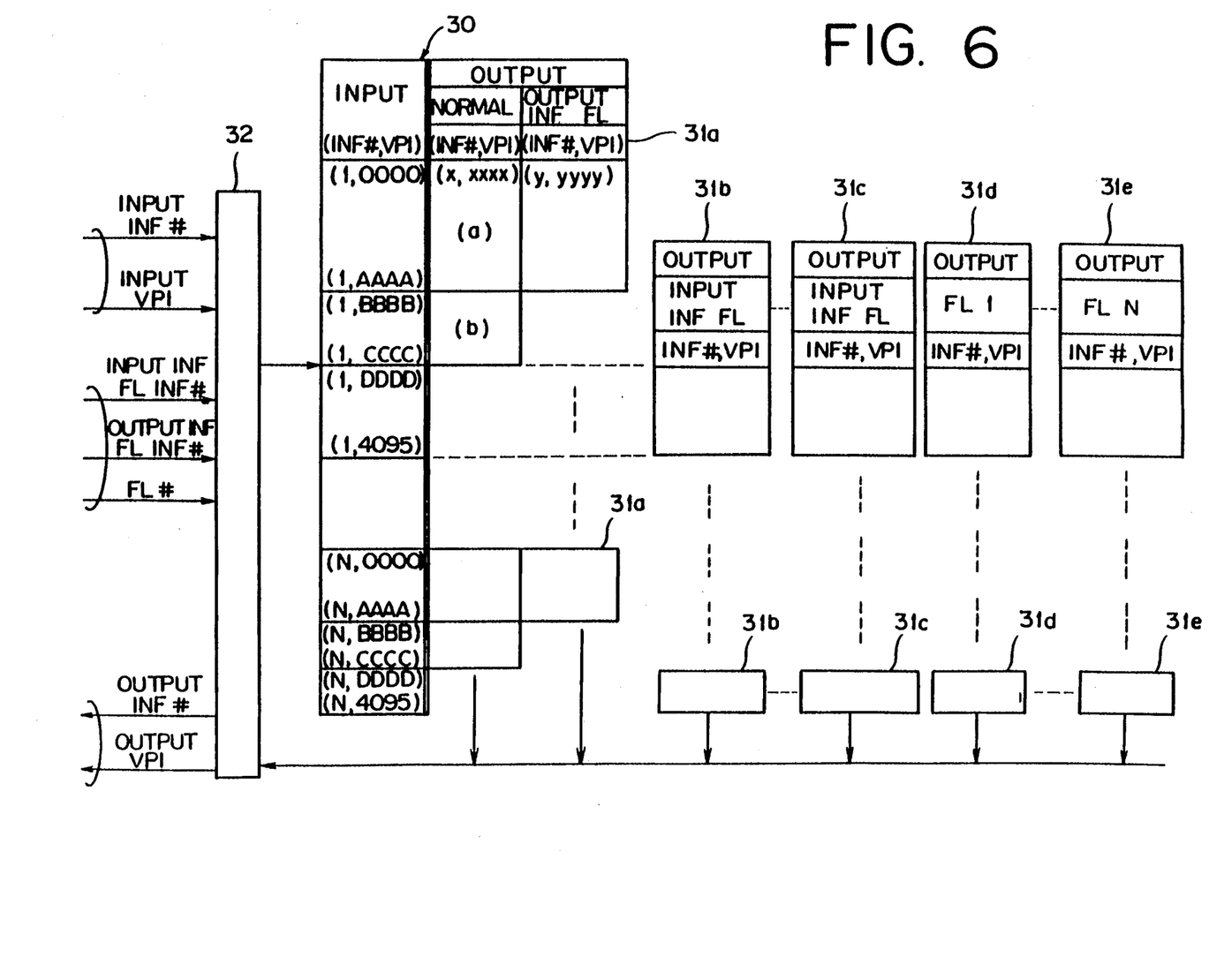
FIG. 6 is a schematic diagram showing structure of the first and second VPI conversion tables.

Referring now to FIG. 6, an example of the VPI conversion table will be described. Reference numeral 30 denotes the first VPI conversion table outputting, by conversion, the VPI for the cell input under normal communicating conditions. If it is assumed that there are n interfaces, input VPIs 0 to 4095 are assigned to each interface number. For each input interface number, addresses "0" to "AAAA" are assigned to the working virtual paths, addresses "BBBB" to "CCCC" are assigned to the alternate route monitoring and switching virtual paths, and addresses "DDDD" to "4095"0 are assigned to the alternate virtual paths.

The input interface number and input VPI are input to the first VPI conversion table 30 through a control circuit 32. Under normal communicating conditions, the cell of the working virtual path is converted into the output interface number and VPI indicated in the region (a) to be output through the control circuit 32. Further, the cell of the alternate route monitoring and switching virtual path is converted into the output interface number and VPI indicated by the region (b) to be output through the control circuit 32.

Reference numerals 31a to 31e denote the second VPI conversion tables corresponding to each individual failure of the network for converting the VPI of the input cell to the VPI for the alternate virtual path. In the event of a failure, the VPI of the input cell is converted using one table picked out of the second VPI conversion tables 31a to 31e according to the failure and the cell having converted VPI is output from the selected output interface number.

Reference numeral 31a denotes the second VPI conversion table to be used in the event of a failure of the output interface and a failure of the link connected to the output interface. When the output interface number in the region (a) comes into agreement with a failed output interface number, the content of the VPI conversion table 31a is read. Reference numeral 31b is the second VPI conversion table to be used in the event of a failure of the input interface of the input interface number 1 and the link connected to it, and reference numeral 31c denotes the second VPI conversion table to be used in the event of a failure of the input interface of the interface input number n and the link connected to it. There are provided n conversion tables, respectively, each corresponding to the input interface numbers 1 to n. Reference numeral 31d denotes the second VPI conversion table to be used in the event of another failure pattern "1" within the network except for the input interface and output interface failures, and reference numeral 31e is the second VPI conversion table to be used in the event of a failure pattern "m". There are provided n conversion tables, respectively, each corresponding to the input interface numbers 1 to n, In the event of an input interface failure, content of the second VPI conversion table 31b or 31c is read according to the pattern of the failure and output through the control circuit 32. That is, the VPI of the input cell is converted into a VPI for an alternate virtual path to be output through a selected output interface number. In the event of a failure other than that of the input/output interface and that of the links connected to them, i.e., in the event of breakage of another link within the network, content of the second VPI conversion table 31d or 31e according to the pattern of the failure is read and output through the control circuit 32. That is, the VPI of the input cell is converted into the VPI for the alternate virtual path to be output through a selected output interface number.

Although, in FIG. 6, only two VPI conversion tables 31b and 31c for input interface failure are shown for each input interface number and only two VPI conversion tables 31d and 31e for other failure are shown for each input interface number for simplicity of explanation, there are, in reality, provided n and m tables corresponding to the patterns of failure.

Referring back to FIG. 2, OAM cells (Operation Administration and Management cells) are passed through the alternate route monitoring and switching virtual paths 15 and 16, whereby the state of the alternate routes are monitored. The monitoring, under normal conditions, is performed by having the OAM cells periodically passed through the alternate route monitoring and switching virtual paths 15 and 16 from the node C at the start point to the node D at the end point of the alternate routes.

Figure 7:
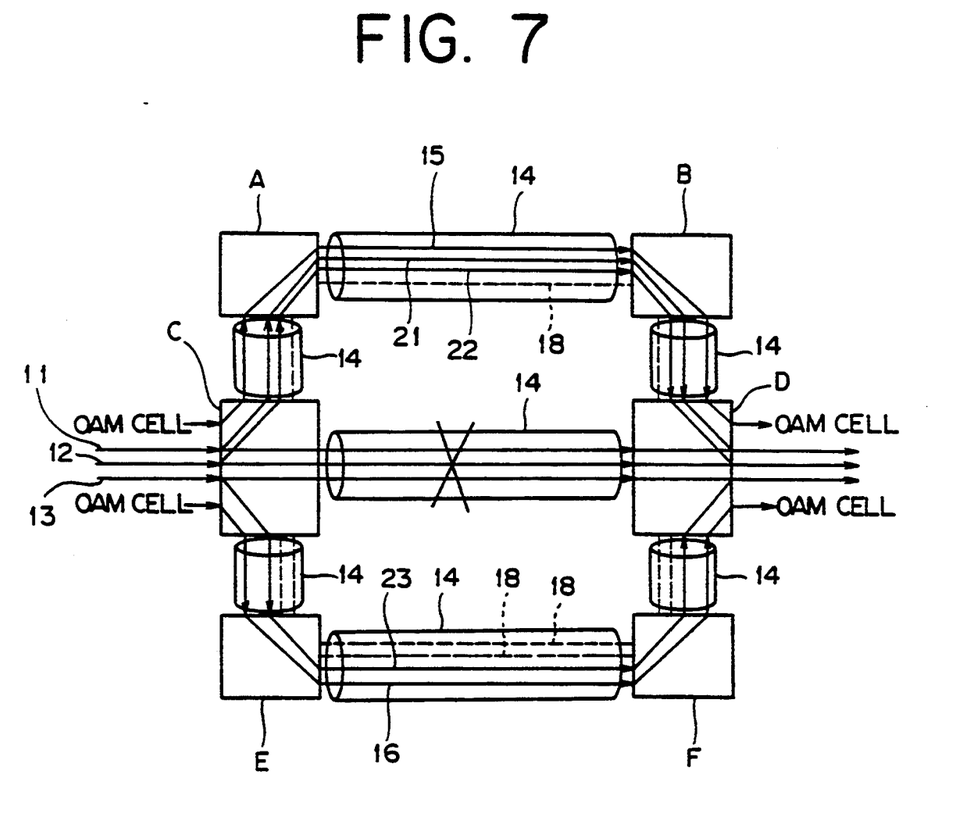
FIG. 7 is a schematic diagram showing a method for achieving restoration from failures according to the embodiment of the present invention as related with its functioning when a link failure occurs.

In the event of a failure, for example, that occurring in the link 14 connecting the nodes C and D as indicated by the X mark in FIG. 7, the node D detects the failure and sends an alarm for station to the node C. The node C, upon receipt of the alarm for station, passes the OAM cells through the alternate route monitoring and switching virtual paths 15 and 16 to thereby instruct the nodes A, B, E, and F, through which the virtual paths 15 and 16 pass, to switch their VPI conversion tables.

These nodes A, B, E, and F, upon detection of the OAM cell, switch the first VPI conversion table 30 shown in FIG. 6 to any of the second VPI conversion tables 31a to 31e corresponding to the failure notified by the OAM cell. Thereby, the VPI of the input cell is converted into the VPI for the alternate virtual path to be output from a selected output interface. Thus, the alternate virtual paths 21 and 22 are set up in the alternate route passing through the nodes A and B and the alternate virtual path 23 is set up in the alternate route passing through the nodes E and F.

When the alternate route is not normal, the switching of the VPI conversion table is stopped and a notice of abnormality is given to the operation system. The operation system, upon receipt of the notice, copes with the link failure by setting up another alternate route.

The failures described in the foregoing were single-link failures, but in the event of failures occurring on multiple links in the network, it is possible that these failures simultaneously use a spare band or capacity of a link as the alternate route. In such case, since the link is incorporating a plurality of alternate route monitoring and switching virtual paths, OAM cells pass through the plurality of alternate route monitoring and switching virtual paths instructing to switch the VPI conversion table. The node through which the OAM cells pass detects them and informs the operation system of the detected result as an abnormality. The operation system, when such a contention on the alternate virtual path occurs, arbitrates the contention and sets up the alternate route anew.

Figure 8:
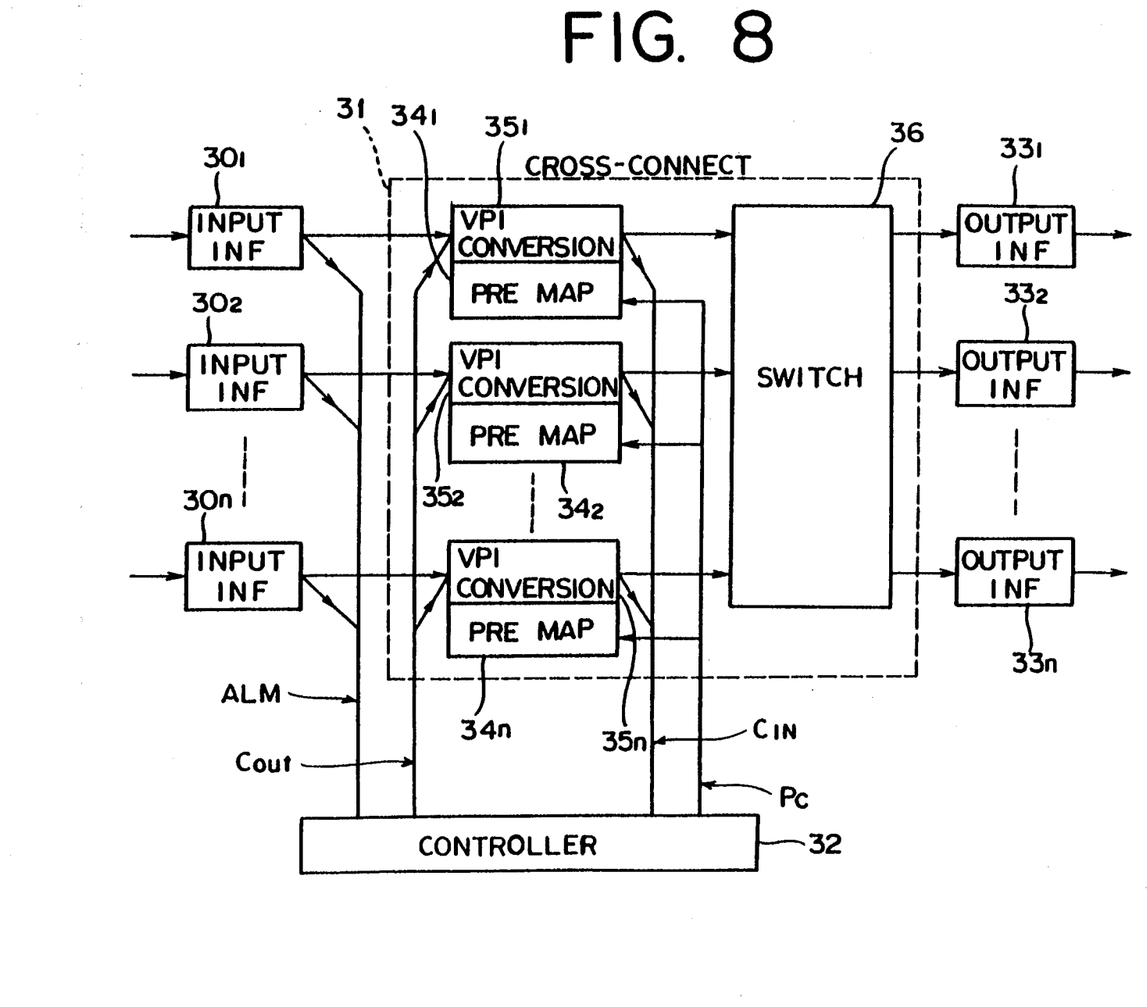
FIG. 8 is a block diagram schematically showing a structure of a VPI conversion table switching system.

Referring now to FIG. 8, the structure of a system performing switching of the VPI conversion tables will be described. The VPI conversion table switching system shown in FIG. 8 is provided in each of the nodes A to F.

The VPI conversion table switching system shown in FIG. 8 is made up of input interfaces $30_1$, $30_2$, ... $30n$ connected with n input ports (not shown) to which cells are input, a cross-connect device 31, a control portion 32, and output interfaces $33_1$, $33_2$, ... $33_n$ from which cells are output. The cross-connect device 31 is made up of VPI conversion portions $35_1$, $35_2$, ... $35n$ having the VPI conversion tables $34_1$, $34_2$, ... $34_n$, and an N×N type switch portion 36 having both vertical N signal lines and horizontal N signal lines for performing route switching for the cell supplied from the VPI conversion portion $35_1$, $35_2$, ... $35_n$ and outputting the cell to the output interface $33_1$–$33_n$.

The input interface $30_1$–$30_n$ outputs the cell input to the input port to the VPI conversion portion $35_1$–$35_n$ and also outputs the alarm ALM detected when a failure occurred to the control portion 32. The VPI conversion portion $35_1$–$35_n$ separates an OAM cell $C_{IN}$ from the cell supplied from the input interface $30_1$–$30_n$ and outputs it to the control portion 32 and also multiplexes an OAM cell $C_{OUT}$ output from the control portion 32 and the main signal (information cell) and outputs the multiplexed cell to the switch portion 36. The control portion 32 detects occurrence of a failure from the alarm ALM, and, when the control portion 32 receives the OAM cell instructing to switch the VPI conversion table (preplanned map) $34_1$–$34_n$, it outputs a preplanned map control signal Pc to the VPI conversion portion $35_1$–$35_n$ so that the VPI conversion table $34_1$–$34_n$ is switched over.

Figure 9:
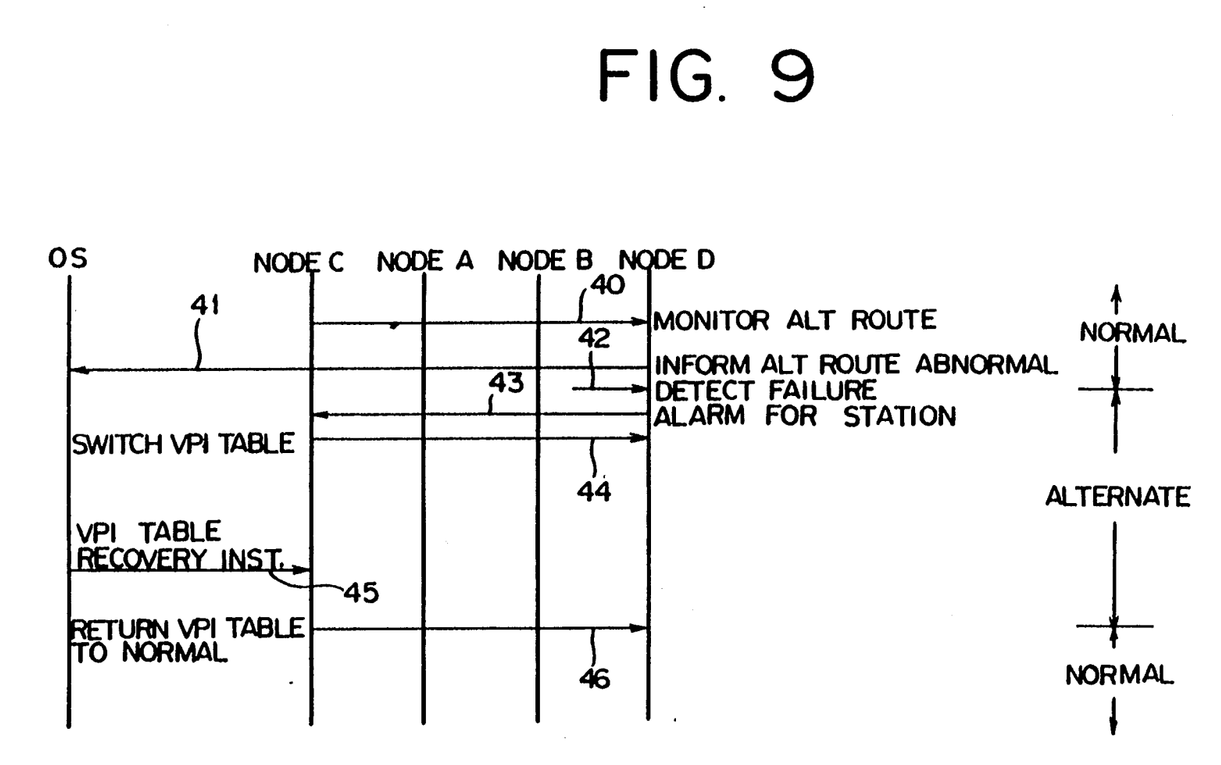
FIG. 9 is a diagram explanatory of the operation sequence in a method for achieving restoration from failures according to an embodiment of the present invention.

Below will be given description of the operation sequence in the above described communications network with reference to FIG. 9, where, however, the alternate route is limited to that passing through the nodes A and B.

Under normal conditions, as shown by the arrow 40, the node C transmits an OAM cell (normal) to the node D along the alternate route monitoring and switching virtual path 15 on a long-period cycle not occupying the band of the link. If the alternate route 19 is abnormal at this time, the node D gives a notice of it to the operation system OS as shown by the arrow 41.

If a failure occurs in the link 14 connecting the node C and the node D as indicated by the X mark in FIG. 7, for example, the node D detects the failure as indicated by the arrow 42 and transmits an alarm for station to the node C at the upstream failure end. The node C, upon receipt of the alarm for station, transmits an OAM cell (preplanned-map switching instruction), for instructing the nodes A and B connected to the alternate route to switch the VPI conversion table, along the alternate route monitoring and switching virtual path 15 as shown by the arrow 44 on a short-period cycle. The nodes A and B, when such OAM cell has passed therethrough j times, execute the switching of the VPI conversion table (preplanned map). Thereby, alternate virtual paths 21 and 22 are set up in the alternate route passing through the nodes A and B.

When the failure is repaired, the operation system OS transmits a preplanned map recovering instruction to the node C at the failure end as indicated by the arrow 45. The node C upon receipt of it transmits an OAM cell (for preplanned map recovery) to the node D on a short-period cycle along the alternate route monitoring and switching virtual path 15 as indicated by the arrow 46 so that the VPI conversion table is returned to that for the normal state. The nodes A and B, when the OAM cell has passed therethrough k times, returns the VPI conversion table to that for the normal state and release the connections of the alternate virtual paths 21 and 22. The period of OAM cell transmission and the number of detection times j and k for ensuring accurate detection are determined considering the time required for switching and the time for ensuring accurate detection set up in view of the communications quality.

According to the method for structuring a communications network based on the asynchronous transfer mode of the present invention as described in the foregoing, since the VPI of an alternate virtual path is shared by a plurality of patterns of failures, no restriction is placed on the number of VPIs assignable to the working virtual paths. Since the VPI conversion table is switched as soon as the passing of OAM cell instructing the switching of the VPI conversion table is detected, the virtual path can be switched quickly. Further, since the state of the route of the alternate virtual path is monitored at all times, it is made possible to keep the alternate virtual path ready for switching of the virtual path in the event of a failure.

What is claimed is:

1. A method for structuring a communications network based on an asynchronous transfer mode holding communications with cells transferred between a first node on the upstream side and a second node on the downstream side, said first node and second node being connected by a working route and by a plurality of alternate routes each including a plurality of intermediate nodes, said working route including at least one link accommodating working virtual paths and connecting said first and second nodes, each of said alternate routes including a plurality of links connecting adjoining nodes, and each of said links being capable of accommodating a plurality of virtual paths, said method for structuring a communications network comprising the steps of:

preparing a first VPI conversion table according to which the virtual path identifier (VPI) of the input cell is converted to be output under normal communicating conditions;

preparing a plurality of second VPI conversion tables according to which the VPI of the input cell is converted into the VPI for an alternate virtual path corresponding to every failure pattern, the VPI for an alternate virtual path being shared by a plurality of failure patterns;

reorganizing said first and second VPI conversion tables for each node;

distributing the reorganized first and second VPI conversion tables to all said nodes;

setting up an alternate route monitoring and switching virtual path in each of said alternate routes;

transmitting a monitoring cell along each of said alternate routes such that said second node, when a failure occurs in said working route, detects the failure and transmits an alarm for station to said first node;

said first node, upon receipt of the alarm for station, transmits a switching command cell to switch said first VPI conversion tables to said second VPI conversion table along each of said alternative route monitoring and switching virtual paths;

said first node and said intermediate nodes switch said first VPI conversion table to said second VPI conversion table prepared in advance corresponding to every failure pattern; and convert the VPI of the input cell in accordance with the switched second VPI conversion table and transmit the cell along said alternate route, whereby an alternate virtual path is set up in said alternate route.

2. A method for structuring a communications network according to claim 1, wherein said first VPI conversion table includes a VPI conversion table for the alternate route monitoring and switching virtual path and a VPI conversion table for the alternate virtual path.

3. A method for structuring a communications network according to claim 1, wherein one of said intermediate nodes, upon detecting a malfunction of the alternate route in which said intermediate node is included during the course of normal communication, gives a notice of the malfunction to all of the nodes on the downstream side and the operation system.

4. A method for structuring a communications network according to claim 1, wherein one of said nodes, when it detects said switching command cells from a plurality of alternate route monitoring and switching virtual paths incorporated in the links constituting said alternate route, gives a notice of coincident failures to all of the nodes on the downstream side and an operation system; and the operation system, upon receipt of the notice of coincident failures, arbitrates the contention of coincident failures and sets up the alternate route anew.

5. A method for structuring a communications network based on an asynchronous transfer mode holding communications with cells transferred between a first node on the upstream side and a second node on the downstream side, said first node and second node being connected by a working route and by a plurality of alternate routes each including a plurality of intermediate nodes, said working route including at least one link accommodating working virtual paths and connecting said first and second nodes, each of said alternate routes including a plurality of links connecting adjoining nodes, and each of said links being capable of accommodating a plurality of virtual paths., said method for structuring a communications network comprising the steps of:

preparing a first VPI conversion table according to which the virtual path identifier (VPI) of the input cell is converted to be output under normal communicating conditions;

preparing a plurality of second VPI conversion tables according to which the VPI of the input cell is converted into the VPI for an alternate virtual path corresponding to every failure pattern;

reorganizing said first and second VPI conversion tables for each node;

distributing the reorganized first and second VPI conversion tables to all of said nodes;

setting up an alternate route monitoring an switching virtual path in each of said alternate routes;

transmitting a monitoring cell along each of said alternate routes, said second node, when a failure occurs in said working route, detects the failure and transmits an alarm for station to said first node;

said first node, upon receipt of the alarm for station, transmits a switching command cell to switch said first VPI conversion table to said second VPI conversion table along each of said alternate route monitoring and switching virtual paths;

said first node and said intermediate nodes switch said first VPI conversion table to said second VPI conversion table prepared in advance corresponding to every failure pattern and convert the VPI of the input cell in accordance with the switched second VPI conversion table and transmit the cell along said alternate route, whereby an alternate virtual path is set up in said alternate route, and wherein said first node, when the failure of said working route is repaired, receives a command for recovering the normal-state VPI conversion table transmitted from said operation system;

said first node transmits a switching command cell based on said command for recovery along said alternate route monitoring and switching virtual path; and said intermediate node, upon receipt of said switching command cell, switches the second VPI conversion table back to the first VPI conversion table.

6. A method for structuring a communications network based on an asynchronous transfer mode holding communications with cells transferred between a first node on the upstream side and a second node on the downstream side, said first node and second node being connected by a working route and by a plurality of alternate routes each including a plurality of intermediate nodes, said working route including at least one link accommodating working virtual paths and connecting said first and second nodes, each of said alternate routes including a plurality of links connecting adjoining nodes, and each of said links being capable of accommodating a plurality of virtual paths, said method for structuring a communications network comprising the steps of:

preparing a first VPI conversion table according to which the virtual path identifier (VPI) of the input cell is converted to be output under normal communicating conditions;

preparing a plurality of second VPI conversion tables according to which the VPI of the input cell is converted into the VPI for an alternate virtual path corresponding to every failure pattern;

reorganizing said first and second VPI conversion tables for each node;

distributing the reorganized first and second VPI conversion tables to all of said nodes;

setting up an alternate route monitoring an switching virtual path in each of said alternate routes;

transmitting a monitoring cell along each of said alternate routes, said second node, when a failure occurs in said working route, detects the failure and transmits an alarm for station to said first node;.

said first node, upon receipt of the alarm for station, transmits a switching command cell to switch said first VPI conversion table to said second VPI conversion table along each of said alternate route monitoring and switching virtual paths;

said first node and said intermediate nodes switch said first VPI conversion table to said second VPI conversion table prepared in advance corresponding to every failure pattern and convert the VPI of the input cell in accordance with the switched second VPI conversion table .and transmit the cell along said alternate route, whereby an alternate virtual path is set up in said alternate route, and wherein said alternate route monitoring cell is transmitted periodically and, when a failure occurs, said VPI conversion table switching command cell is transmitted periodically.

7. A method for structuring a communications network according to claim 6, wherein the period of transmission of said VPI conversion table switching command cell and the period of transmission of said monitoring cell are adapted to be variable.

8. A method for structuring a communications network according to claim 6, wherein the period of transmission of said VPI conversion table switching command cell is shorter than the period of transmission of said monitoring cell.

9. A method for use in a communication network including nodes coupled by links, the nodes and links transferring cells in the communication network, comprising the steps of:

a) storing in a memory, a first virtual path identifier (VPI) conversion table to convert a VPI of a first input cell input to one of the nodes, into a VPI for a first output cell derived from the first input cell and output from the one of the nodes, the VPI for the first output cell corresponding to a first working virtual path used in a normal condition of the communication network, in which no first failure pattern exists which would render the first working virtual path unusable to transfer the first output cell; and b) storing second VPI conversion tables in the memory, a first one of the second VPI conversion tables being used to convert the VPI for the first input cell into a VPI for the first output cell for an alternate virtual path, based on a first failure pattern rendering the first working virtual path unusable, and a second one of the second VPI conversion tables being used to convert based on a second failure pattern rendering a second working virtual path unusable, a VPI of a second input cell input to the one of the nodes, into a VPI for a second output cell derived from the second input cell and output from the one of the nodes, the VPI for the second output cell being for the alternate virtual path.

10. A method as claimed in claim 9, further comprising the steps of:

c) detecting the first failure pattern; and d) converting the VPI of the first input cell using the first one of the second VPI conversion tables, into the VPI for the first output cell for the alternate virtual path.

11. A method as claimed in claim 10, further comprising the steps of:

e) monitoring the alternate virtual path for failure by transmitting at least one operation and administration management (OAM) cell on the alternate virtual path.

* * * * *